(12) United States Patent
Hess et al.

(10) Patent No.: US 6,372,284 B1
(45) Date of Patent: Apr. 16, 2002

(54) FLUOROPOLYMER COATING OF LITHIUM NIOBATE INTEGRATED OPTICAL DEVICES

(75) Inventors: Larry A. Hess, Poolesville; William C. Imes, Walkersville, both of MD (US)

(73) Assignee: Optelecom, Inc., Gaithersburg, MD (US)

( * ) Notice: Subject to any disclaimer, the term of this patent is extended or adjusted under 35 U.S.C. 154(b) by 0 days.

(21) Appl. No.: 09/095,694

(22) Filed: Jun. 11, 1998

(51) Int. Cl.⁷ .................................................. B05D 5/12
(52) U.S. Cl. ..................... 427/58; 427/384; 427/402; 427/163.2
(58) Field of Search ................... 427/58, 124, 163.2, 427/374.2, 384, 402

(56) References Cited

U.S. PATENT DOCUMENTS

| | | |
|---|---|---|
| 4,838,989 A | 6/1989 | Ashby et al. |
| 4,880,288 A | 11/1989 | Vatoux et al. |
| 4,984,861 A | 1/1991 | Suchoski, Jr. et al. |
| 5,004,314 A | 4/1991 | Booth et al. |
| 5,005,932 A | 4/1991 | Schaffner et al. |
| 5,015,052 A | 5/1991 | Ridgway et al. |
| 5,091,981 A | 2/1992 | Cunningham |
| 5,138,480 A | 8/1992 | Dolfi et al. |
| 5,181,134 A | 1/1993 | Fatehi et al. |
| 5,189,713 A | 2/1993 | Shaw |
| 5,220,627 A * | 6/1993 | Kawano et al. ............... 385/3 |
| 5,267,336 A | 11/1993 | Sriram et al. |
| 5,276,744 A | 1/1994 | Shaw |
| 5,339,369 A | 8/1994 | Hopfer et al. |
| 5,403,437 A | 4/1995 | Beratan et al. |
| 5,413,687 A * | 5/1995 | Barton et al. .......... 204/192.14 |
| 5,442,719 A | 8/1995 | Chang et al. |
| 5,455,876 A | 10/1995 | Hopfer et al. |
| 5,502,780 A | 3/1996 | Madabhushi |
| 5,561,549 A | 10/1996 | Hatori et al. |
| 5,576,879 A | 11/1996 | Nashimoto |
| 5,581,643 A | 12/1996 | Wu |
| 5,596,436 A | 1/1997 | Sargis et al. |
| 5,708,734 A | 1/1998 | Van Der Tol |
| 5,748,358 A | 5/1998 | Sugamata et al. |
| 5,749,132 A | 5/1998 | Mahapatra et al. |

\* cited by examiner

Primary Examiner—Brian K. Talbot
(74) Attorney, Agent, or Firm—Miles & Stockbridge P.C.

(57) ABSTRACT

An integrated optical device is made starting with a substrate of lithium niobate. A fluoropolymer solution is applied to coat at least part of the substrate. The substrate having fluoropolymer coat is prepared such that a metal film will adhere to the fluoropolymer coating. Next, an electrode is created by applying a metal film to the fluoropolymer coat. The preparing step is preferably accomplished by heating the substrate with the fluoropolymer coating on it such that the fluoropolymer coating is annealed, the annealing of the fluoropolymer coating improving the adhesion of the metal film to the fluoropolymer coating. Alternately, the preparing of the substrate having fluoropolymer coating includes, simultaneously with the application of the metal film, cooling the substrate with the fluoropolymer coating by contacting a thermal sink with the substrate with the fluoropolymer coating.

15 Claims, 1 Drawing Sheet

FLUOROPOLYMER COATING OF LITHIUM NIOBATE INTEGRATED OPTICAL DEVICES

BACKGROUND OF THE INVENTION

The present invention relates to integrated optical devices. More specifically, the present invention relates to a process for making such devices and devices made by the process.

Various integrated optical devices have been made using various materials including substrates of lithium niobate ($LiNbO_3$). Such devices are made to perform optical (including electro-optical) functions in materials having optical properties.

Typically, the substrate of such an integrated optical device has a layer of silicon dioxide on it and a metal film electrode on the silicon dioxide. However, there are often difficulties in manufacturing with a metal film electrode unless the metal film is thicker than otherwise preferable. The width (i.e., a dimension parallel to the plane of a surface to which the metal film is deposited) of such an electrode is often quite small. If the height or thickness of such a film is greater than the width, avoiding manufacturing artifacts from thickness variations is difficult or impossible. At the same time, the silicon dioxide makes it advisable to use metal film of a minimum thickness. If the width is increased to avoid the artifacts associated with a height greater than width, other manufacturing problems arise. Complicating the matter, the silicon dioxide makes it advisable to use metal film of a minimum thickness such that the artifacts are more likely to occur.

Fluoropolymer coatings such as those sold under the TEFLON trademark of DUPONT have been applied for measuring electrical properties, but do not have proper adhesion properties to be used for optical or microwave frequency applications. The addition of fluorinated surfactants to photoresist solutions to apply a thin film of photoresist to a fluoropolymer surface is described in, for example, U.S. Pat. No. 5,403,437 Beratan et al. entitled Fluorosurfactant in Photoresist for Amorphous Teflon™ Patterning. This patent also describes the use of reactive plasma etching for "adhesion properties . . . better than as-deposited . . . films." The adhesion induced by the reactive ion etching alone is not sufficient to pass an industry-standard tape pull test.

U.S. Pat. No. 5,413,687 issued to Barton et al. and entitled Method for Metalizing Fluoropolymer Substrates describes the use of reactive plasma etching and bias sputtering to apply metal to fluoropolymers.

OBJECTS AND SUMMARY OF THE INVENTION

Accordingly, it is a primary object of the present invention to provide a new and improved process for making integrated optical devices.

Another object of the present invention is to provide a new and improved integrated optical device.

A more specific object of the present invention is to provide integrated optical devices that are less subject to manufacturing artifacts than typical in the past.

A further object of the present invention is to provide integrated optical devices that have advantageous optical, electrical, thermal and/or stress-resistance characteristics.

Yet another object of the present invention is to provide an integrated optical device which is relatively easy to manufacture.

A further object of the present invention is to provide an integrated optical device having a metal film electrode thereon providing advantageous characteristics.

The above and other features of the present invention which will be more readily understood when the following detailed description is considered in conjunction with the accompanying drawing are realized by a method of making an integrated optical device including the steps of, in order: providing a substrate; applying a fluoropolymer solution to coat at least part of the substrate; and creating an electrode by applying a metal film to the fluoropolymer coat.

Preferably, the process further includes the step of, prior to the creating of the electrode, heating the substrate with the fluoropolymer coating on it such that the fluoropolymer coating is annealed, the annealing of the fluoropolymer coating improving the adhesion of the metal film to the fluoropolymer coating. The heating of the substrate with the fluoropolymer coating on it is performed at 60 to 350 degrees centigrade. (More preferably, the heating is done to 100 to 350 degrees centigrade.) This heating is done by ramping the temperature from ambient to a maximum temperature in the range of 60 to 350 degrees centigrade. Prior to the application of the fluoropolymer coating to the substrate, a primer is applied to the substrate. The primer is a fluoro-silane solution applied to the substrate using a spin coater.

After applying the fluoro-silane solution and before applying the fluoropolymer coating, the substrate is heated to drive off solvent in the primer. As an alternative to heating the substrate with the fluoropolymer coating on it such that the fluoropolymer coating is annealed, the adherence of the metal film to the fluoropolymer coating is improved by further including the step of, simultaneously with the application of the metal film, cooling the substrate with the fluoropolymer coating by contacting a thermal sink with the substrate with the fluoropolymer coating.

The substrate is lithium niobate. The metal film is applied by the substeps of applying an adhesion promoter to the fluoropolymer coating and then applying a contact metal and wherein the integrated optical device is an electro-optical device. After application of the fluoropolymer coating, a post annealing heating of the substrate with fluoropolymer coating and metal film is performed by raising the temperature, preferably by ramping (i.e., meaning temperature is raised as a ramp function, either a continuous ramp function or a stepped ramp function), from ambient to a maximum temperature in the range of 60 to 350 degrees centigrade. More preferably, the maximum temperature for this step is 150 to 350 degrees centigrade.

The present invention may alternately be described as a method of making an integrated optical device including the steps of, in order: providing a substrate of lithium niobate; applying a fluoropolymer solution to coat at least part of the substrate; and preparing the substrate having fluoropolymer coat such that a metal film will adhere to the fluoropolymer coating. Preferably, after the preparing the substrate having fluoropolymer coat, an electrode is created by applying a metal film to the fluoropolymer coat.

The preparing of the substrate having fluoropolymer coating may include heating the substrate with the fluoropolymer coating on it such that the fluoropolymer coating is annealed, the annealing of the fluoropolymer coating improving the adhesion of the metal film to the fluoropolymer coating. The heating of the substrate with the fluoropolymer coating on it is performed by ramping the temperature from ambient to a maximum temperature in the range of 60 to 350 degrees centigrade. Prior to the application of the fluoropolymer coating to the substrate, a primer is applied to the substrate. The primer is a fluoro-silane solution applied to the substrate using a spin coater. (Other coating methods such as spraying and evaporation may be used as well.) After applying the fluoro-silane solution and before applying the fluoropolymer coating, the substrate is heated to drive off solvent in the primer.

An alternate preparing of the substrate having fluoropolymer coating includes, simultaneously with the application of the metal film, cooling the substrate with the fluoropolymer coating by contacting a thermal sink with the substrate with the fluoropolymer coating.

The metal film is applied by the substeps of applying an adhesion promoter to the fluoropolymer coating and then applying a contact metal. A post annealing heating of the substrate with fluoropolymer coating and metal film is performed by ramping at a controlled rate (1–10° C./min) the temperature from ambient to a maximum temperature in the range of 60 to 350 degrees centigrade.

The present invention may alternately be described as an integrated optical device including: a substrate; a fluoropolymer coat on the substrate; and a metal film electrode on the fluoropolymer coat. The substrate is lithium niobate. The metal film is from 0.1 to 20 $\mu$m thick. The metal film includes an adhesion-promoter layer of from 100 to 1000 Angstroms. The integrated optical device is an electro-optical device.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

Figure 1:
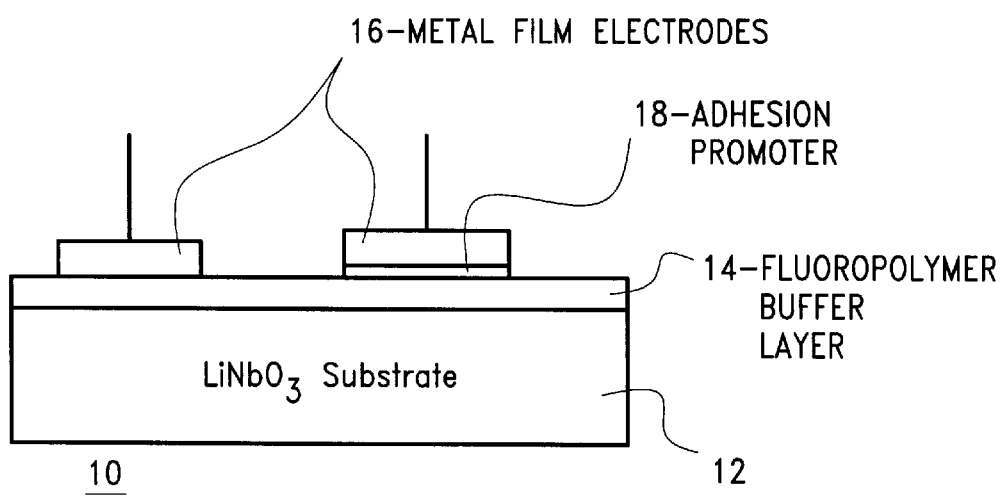
FIG. 1 is a simplified side view of an integrated optical device according to the present invention.

An integrated optical device is manufactured by the following processes.

EXAMPLE 1

A lithium niobate substrate is first prepared by removing any contamination on the surface by rinsing with an organic solvent such as acetone or methanol followed by deionized water. Driving off all moisture in a prebake environment (70–200° C. for 10–60 min.) then follows this. The surface is then treated with a fluoro-silane solution (primer) that is applied on the spin coater at a controlled rotational rate (such as for example 250–5000 RPM)to provide a uniform thin layer on the lithium niobate. (As will be readily appreciated, the spin coater is a well known device used in known fashion for coating an object.)

The treated lithium niobate is then heated to a maximum temperature in the range of (40–100° C. for 10–60 min.) to drive off the solvent that is contained in the primer. The fluoropolymer solution such as DuPont TEFLON® AF 1600 is then applied to the lithium niobate and then spun at a pre-determined speed that will provide the desired thickness of the fluoropolymer coating. The coated material is then heated from ambient temperature to a maximum predetermined temperature in the range of (60–350° C.) to perform annealing of the fluoropolymer coating to the lithium niobate.

The material is then subjected to reactive plasma etching in a controlled environment (50–500 millitorr of $O_2$ for example). This is followed by the application of a controlled metal film coating. An adhesion-promoter such as titanium, titanium-tungsten, or chromium (100–1000 Angstroms) is applied by vacuum deposition. Next, a layer of gold or other suitable metal is applied to the desired thickness (100–3000 Angstroms). The material is then subjected to a final post annealing at a determined temperature (60–350°) and heating rate (1–10° C./min) sufficient to relieve stresses in the fluoropolymer film.

This method provides an improved fluoropolymer to metal film adhesion on lithium niobate. Neither the metal film or fluoropolymer film is removed when subjected to an adhesion test similar to that described in MIL-C-48497. In addition, films produced in this manner have been thermally cycled through the proposed storage temperature range (−40° C.−+80) without loss of adhesion. With the use of a secure fluoropolymer and metal film coating, the electrical properties of integrated optical devices such as lithium niobate electro-optical devices is greatly improved.

The described process applies a uniform thin film layer on lithium niobate ($LiNbO_3$) to improve mechanical and electrical properties of integrated optical devices such as electro-optical devices. Metal films of various thicknesses (0.1–20 $\mu$m) are applied to the fluoropolymer coatings on the lithium niobate substrate. The adhesion must be sufficient to support metal films under a variety of environmental conditions (including temperature cycling and thermal shock) and the process provides the sought after characteristics. The device made by this process may, for example, be an optical modulator.

EXAMPLE 2

In the process described above, the substrate with the fluoropolymer coating on it is prepared for receiving the metal film by heating the substrate with the fluoropolymer coating on it such that the fluoropolymer coating is annealed. Example 2 is the same as example 1 except that, as an alternative to heating the substrate with the fluoropolymer coating on it such that the fluoropolymer coating is annealed, the adherence of the metal film to the fluoropolymer coating is improved by further including the step of, simultaneously with the application of the metal film, cooling the substrate with the fluoropolymer coating by contacting a thermal sink with the substrate with the fluoropolymer coating.

With reference now to FIG. 1, a specific design integrated optical device 10 made by the present processes is shown. The device 10, which may for example be an optical modulator, has a lithium niobate substrate 12, the fluoropolymer buffer layer 14 deposited thereon, and the metal film electrodes 16. The electrodes may have an adhesion promoter layer 18. (For ease of illustration, the adhesion promoter layer 18 is shown only for the right most electrode in FIG. 1).

The metal film is from 0.1 to 20 $\mu$m. The adhesion promoter layer is from 100 to 1000 Angstroms thick. The integrated optical device is an electro-optical device. As used herein, an electro-optical device is a integrated optical device having electrical inputs.

Although specific constructions have been presented herein, it is to be understood that these are for illustrative purposes only. Various modifications and adaptations will be apparent to those of skill in the art. In view of possible modifications, it will be appreciated that the scope of the present invention should be determined by reference to the claims appended hereto. For example, an important feature of the present invention is the substrate being made of lithium niobate, but the invention is not limited to use of lithium niobate substrates except where the claims specifically recite such a substrate.

What is claimed is:

1. A method of making an integrated optical device comprising the steps of, in order:
   providing a substrate;
   applying a fluoropolymer solution to coat at least part of the substrate; and
   creating an electrode by applying a metal film to the fluoropolymer coat; and further comprising the step of, prior to the creating of the electrode, annealing the fluoropolymer coating by heating the substrate with the fluoropolymer coating on it, the annealing of the fluoropolymer coating improving the adhesion of the metal film to the fluoropolymer coating.

2. The method of claim 1 wherein the heating of the substrate with the fluoropolymer coating on it is performed by a maximum temperature in the range of 60 to 350 degrees centigrade.

3. The method of claim 2 further comprising the step of, prior to the application of the fluoropolymer coating to the substrate, applying a primer to the substrate.

4. The method of claim 3 wherein the primer is a fluoro-silane solution applied to the substrate using a spin coater.

5. The method of claim 4 further comprising the step of, after applying the fluoro-silane solution and before applying the fluoropolymer coating, heating the substrate to drive off solvent in the primer.

6. The method of claim 1 wherein the substrate is lithium niobate.

7. The method of claim 1 wherein the metal film is applied by the substeps of applying an adhesion promoter to the fluoropolymer coating and then applying a contact metal and wherein the integrated optical device is an electro-optical device.

8. A method of making an integrated optical device comprising the steps of, in order:
   providing a substrate;
   applying a fluoropolymer solution to coat at least part of the substrate;
   annealing the fluoropolymer coating by heating the substrate with the fluoropolymer coating on it, the annealing of the fluoropolymer coating improving the adhesion of a metal film to the fluoropolymer coating,
   creating an electrode by applying a metal film to the fluoropolymer coat,
   further comprising the step of performing a post annealing heating of the substrate with fluoropolymer coating and metal film by ramping the temperature at a controlled rate (1–10° C./min) from ambient to a maximum temperature in the range of 60 to 350 degrees centigrade.

9. A method of making an integrated optical device comprising the steps of, in order:
   providing a substrate of lithium niobate;
   applying a fluoropolymer solution to coat at least part of the substrate; and
   preparing the substrate having fluoropolymer coat such that a metal film will adhere to the fluoropolymer coating; and
   further comprising the step of, after the preparing the substrate having fluoropolymer coat, creating an electrode by applying a metal film to the fluoropolymer coat; and wherein the preparing of the substrate having fluoropolymer coating includes annealing the fluoropolymer coating by heating the substrate with the fluoropolymer coating on it, the annealing of the fluoropolymer coating improving the adhesion of the metal film to the fluoropolymer coating.

10. The method of claim 9 wherein the heating of the substrate with the fluoropolymer coating on it is performed by ramping the temperature from ambient to a maximum temperature of 60 to 350 degrees centigrade.

11. The method of claim 10 further comprising the step of, prior to the application of the fluoropolymer coating to the substrate, applying a primer to the substrate.

12. The method of claim 11 wherein the primer is a fluoro-silane solution applied to the substrate using a spin coater.

13. The method of claim 12 further comprising the step of, after applying the fluoro-silane solution and before applying the fluoropolymer coating, heating the substrate to drive off solvent in the primer.

14. The method of claim 9 wherein the metal film is applied by the substeps of applying an adhesion promoter to the fluoropolymer coating and then applying a contact metal.

15. A method of making an integrated optical device comprising the steps of, in order:
   providing a substrate of lithium niobate;
   applying a fluoropolymer solution to coat at least part of the substrate;
   preparing the substrate having fluoropolymer coat such that a metal film will adhere to the fluoropolymer coating, including annealing the fluoropolymer coating by heating the substrate with the fluoropolymer coating on it,
   creating an electrode by applying a metal film to the fluoropolymer coat, the annealing of the fluoropolymer coating improving the adhesion of the metal film to the fluoropolymer coating; and
   further comprising the step of performing a post annealing heating of the substrate with fluoropolymer coating and metal film by ramping the temperature from ambient to a maximum temperature in the range of 60 to 350 degrees centigrade.

* * * * *